UNITED STATES PATENT OFFICE.

RUDOLF PLÖNNIS, OF BERLIN, GERMANY.

WATERPROOF PAINT.

No. 858,536.   Specification of Letters Patent.   Patented July 2, 1907.

Application filed March 28, 1907. Serial No. 365,083.

*To all whom it may concern:*

Be it known that I, RUDOLF PLÖNNIS, a subject of the King of Prussia, residing at Berlin, in the Kingdom of Prussia and German Empire, have invented new and useful Improvements in Waterproof Paints, of which the following is a specification.

My invention relates to an improved paint possessing weatherproof qualities.

In making my new waterproof paint, water-glass in the form of an undiluted, or only very slightly diluted, commercial solution of about 40 degrees Baumé is mixed with alkaline lye of about 40 degrees Baumé, the proportions being about 6 to 8 parts by weight of water-glass solution and 2 to 4 parts by weight of alkaline lye. If to this mixture mineral or metal pigments are added, paints of great body are obtained, which remain for a sufficiently long time so liquid that they can be very easily laid on, this property being due to their high percentage of caustic alkalies. The spreading-qualities can be increased by the addition of varnish, linseed-oil, or turpentine-oil, preferably of about 5 per cent. The paints with these pigments are soluble in water. If, however, there is added to the pigment about 1/5 to 1/2 its weight of cement, the paint is rendered not only weatherproof, but also proof against alkalies and acids. This would scarcely be expected, in view of the presence in the vehicle of the large percentage of caustic alkalies, such as is necessary if the paints are to remain for a considerable time of suitable consistency for laying on. The paint also effectively protects articles coated with it from burning.

The improved paints are suitable for application to metals, which can be thus protected from oxidation, to wood, cement- and ordinary plastering, fabric, paper, pasteboard, etc. In a state of greater consistence the paints may be employed for pasting down linoleum, etc., for cementing purposes, for covering floors, and the like.

What I do claim as my invention and desire to secure by Letters Patent, is:—

1. A paint, consisting of a pigment, water-glass in the form of a solution of about 40 degrees Baumé, alkaline lye of about 40 degrees Baumé, and cement.

2. A paint, consisting of a pigment, cement, and water-glass in the form of a substantially undiluted commercial solution of about 40 degrees Baumé, and alkaline lye of about 40 degrees Baumé, to the extent of substantially 20 to 40 per cent. of the water-glass solution.

In testimony whereof I have signed my name to this specification in the presence of two subscribing witnesses.

RUDOLF PLÖNNIS.

Witnesses:
 BERNHARD GRAET,
 KARL GARZ.